United States Patent
Mehew et al.

(10) Patent No.: US 11,410,227 B2
(45) Date of Patent: Aug. 9, 2022

(54) AUGMENTED REALITY MONEY TRANSFER

(71) Applicant: The Western Union Company, Englewood, CO (US)

(72) Inventors: Evans Mehew, Larkspur, CO (US); Linda DeBerardinis, Littleton, CO (US)

(73) Assignee: The Western Union Company, Denver, CO (US)

( * ) Notice: Subject to any disclaimer, the term of this patent is extended or adjusted under 35 U.S.C. 154(b) by 182 days.

(21) Appl. No.: 16/131,950

(22) Filed: Sep. 14, 2018

(65) Prior Publication Data
US 2019/0012735 A1 Jan. 10, 2019

Related U.S. Application Data

(63) Continuation of application No. 12/825,460, filed on Jun. 29, 2010, now Pat. No. 10,083,482.

(51) Int. Cl.
*G06Q 40/02* (2012.01)
*G06K 7/08* (2006.01)
(Continued)

(52) U.S. Cl.
CPC .............. *G06Q 40/02* (2013.01); *G06K 7/084* (2013.01); *G06K 19/0723* (2013.01);
(Continued)

(58) Field of Classification Search
CPC ........ G06Q 40/02; G06Q 40/00; G06Q 40/04; G06Q 10/10; G06Q 20/322; G06Q 20/202;
(Continued)

(56) References Cited

U.S. PATENT DOCUMENTS 6,307,956 B1 10/2001 Black
10,083,482 B2 9/2018 Mehew et al.
(Continued)

OTHER PUBLICATIONS

Anthony, Dorothy. Impact of Mobile Phones on Selected Dimensions of Well-Being of Post Graduate Students of Bangalore City. Mother Teresa Women's University (India). ProQuest Dissertations Publishing, 2010. 27732233. (Year: 2010).*
(Continued)

*Primary Examiner* — Dennis W Ruhl
*Assistant Examiner* — Fawaad Haider
(74) *Attorney, Agent, or Firm* — Kilpatrick Townsend & Stockton, LLP

(57) ABSTRACT

According to the invention, a system for performing a money transfer between a sender an a recipient through the use of an augmented reality device is disclosed. The system may include a first mobile device associated with a first entity. The first mobile device may be configured to detect an indicator via an augmented reality subsystem. The indicator may include a characteristic and be associated with a second entity, as well as be configured to associate meta-information with the indicator. The first mobile device may further be configured to receive an input comprising an amount to be transferred from the first entity to the second entity and transmit a set of instructions to a money transfer network. The set of instructions may be based in part on the indicator and the input, and include instructions to perform a money transfer between the first entity and the second entity.

18 Claims, 5 Drawing Sheets

(51) Int. Cl.
*G06K 19/07* (2006.01)
*G06Q 10/10* (2012.01)
*G06Q 20/10* (2012.01)
*G06Q 20/20* (2012.01)
*G06Q 20/32* (2012.01)
*G06Q 40/00* (2012.01)
*G06Q 40/04* (2012.01)

(52) U.S. Cl.
CPC ............ *G06Q 10/10* (2013.01); *G06Q 20/10* (2013.01); *G06Q 20/108* (2013.01); *G06Q 20/20* (2013.01); *G06Q 20/202* (2013.01); *G06Q 20/322* (2013.01); *G06Q 40/00* (2013.01); *G06Q 40/04* (2013.01)

(58) Field of Classification Search
CPC ...... G06Q 20/20; G06Q 20/108; G06Q 20/10; G06K 7/084; G06K 19/0723
USPC ......................................................... 705/16
See application file for complete search history.

(56) References Cited

U.S. PATENT DOCUMENTS

| | | | |
|---|---|---|---|
| 2002/0133409 A1 | 9/2002 | Sawano et al. | |
| 2003/0220835 A1 | 11/2003 | Barnes, Jr. | |
| 2004/0169722 A1 | 9/2004 | Pena | |
| 2006/0218063 A1 | 9/2006 | Vogt | |
| 2007/0106721 A1 | 5/2007 | Schloter | |
| 2008/0313047 A1* | 12/2008 | Casares | G06Q 20/40 705/17 |
| 2009/0030287 A1 | 1/2009 | Pradeep et al. | |
| 2009/0254971 A1 | 10/2009 | Herz et al. | |
| 2009/0325542 A1 | 12/2009 | Wentker et al. | |
| 2010/0161399 A1 | 6/2010 | Posner et al. | |
| 2010/0185529 A1* | 7/2010 | Chesnut | G06Q 30/00 705/26.1 |
| 2011/0225069 A1* | 9/2011 | Cramer | G06Q 30/06 705/26.1 |
| 2011/0246276 A1 | 10/2011 | Peters et al. | |
| 2011/0251892 A1* | 10/2011 | Laracey | G06Q 30/0253 705/14.51 |
| 2011/0311094 A1* | 12/2011 | Herzog | H04L 63/0428 382/100 |
| 2011/0320290 A1 | 12/2011 | Mehew et al. | |

OTHER PUBLICATIONS

Chintamani, Keshav. Augmented reality navigation interfaces improve human performance in end-effector controlled telerobotics. Wayne State University. ProQuest Dissertations Publishing, 2010. (Year: 2010).*
Van Waardhuizen,Michael, "The AugmenTable: Markerless hand manipulation of virtual objects in a tabletop augmented reality environment," Iowa State University, ProQuest Dissertations Publishing, 2010, 3 pages.
Non-Final Rejection dated Feb. 17, 2012 for U.S. Appl. No. 12/825,460, all pages.
Final Rejection dated Sep. 24, 2012 for U.S. Appl. No. 12/825,460, all pages.
Non-Final Rejection dated Jan. 7, 2014 for U.S. Appl. No. 12/825,460, all pages.
Final Rejection dated Aug. 29, 2014 for U.S. Appl. No. 12/825,460, all pages.
Non-Final Rejection dated Jul. 1, 2015 for U.S. Appl. No. 12/825,460, all pages.
Non-Final Rejection dated Feb. 11, 2016 for U.S. Appl. No. 12/825,460, all pages.
Final Rejection dated Aug. 26, 2016 for U.S. Appl. No. 12/825,460, all pages.
Non-Final Rejection dated Jun. 7, 2017 for U.S. Appl. No. 12/825,460, all pages.
Final Rejection dated Dec. 13, 2017 for U.S. Appl. No. 12/825,460, all pages.

* cited by examiner

AUGMENTED REALITY MONEY TRANSFER

CROSS-REFERENCES TO RELATED APPLICATIONS

This application is a continuation of U.S. patent application Ser. No. 12/825,460, filed Jun. 29, 2010, and entitled, "AUGMENTED REALITY MONEY TRANSFER," the entire disclosure of which is hereby incorporated by reference, for all purposes, as if fully set forth herein.

BACKGROUND OF THE INVENTION

This invention relates generally to money transfers. More specifically the invention relates to money transfers initiated via augmented reality enabled systems.

Currently, initiating a financial transfer or money transfer can be at least somewhat time consuming. In the case of financial transfers, even credit card systems can be delayed during common nationwide heavy use periods. In the case of money transfers, additional identification requirement of both the sender and receiver can consume time and other resources of both the parties and the money transfer service.

Additionally, the above systems do not even contemplate the use of an additional identity verification source that most people carry, a mobile phone or other device. These devices are often associated with individuals and/or financial accounts, and yet this information is not often referenced to verify identities and/or initiate and complete financial transactions.

Embodiments of the present invention provide solutions to these and other inefficiencies and problems.

BRIEF DESCRIPTION OF THE INVENTION

In one embodiment, a system for performing a money transfer between a sender an a receipt through the use of an augmented reality enabled device is provided. The system may include a first mobile device. The first mobile device may be associated with a first entity. The first mobile device may be configured to detect a first indicator via an augmented reality subsystem. The first indicator may be associated with a second entity. The first indicator may include a characteristic. The augmented reality subsystem may be configured to associate meta-information with the first indicator based on the characteristic. The first mobile device may further be configured to receive an input including an amount to be transferred between the first entity and the second entity. The first mobile device may moreover be configured to transmit a first set of instructions to a money transfer network. The first set of instructions may be based at least in part on the first indicator and the input. The first set of instructions may include instructions to perform a money transfer between the first entity and the second entity.

In another embodiment, a system for performing a money transfer between a sender and a receipt through the use of augmented reality enabled device is provided. The system may include a first mobile device. The first mobile device may be associated with a first entity. The first mobile device may include a first means, a second means, a third means, and a fourth means. The first means may be for detecting a characteristic of a first augmented reality indicator associated with a second entity. The second means may be for associating meta-information with the first augmented reality indicator based on the characteristic. The third means may be for receiving an input comprising an amount to be transferred from the first entity to the second entity. The fourth means may be for transmitting a first set of instructions to a money transfer network. The first set of instructions may be based at least in part on the first indicator and the input. The first set of instructions may include instructions to perform a first money transfer between the first entity and the second entity.

In another embodiment, a method for performing a money transfer between a first entity and a second entity through the use of augmented reality enabled device is provided. The method may include detecting a first indicator via an augmented reality subsystem. The first indicator may be associated with the second entity. The first indicator may include a characteristic. The method may also include associating, with the augmented reality subsystem, meta-information with the first indicator based on the characteristic. The method may further include receiving an input including an amount to be transferred from the first entity to the second entity. The method may moreover include transmitting a first set of instructions to a money transfer network. The first set of instructions may be based at least in part on the first indicator and the input. The first set of instructions may include instructions to perform a money transfer between the first entity and the second entity.

BRIEF DESCRIPTION OF THE DRAWINGS

The present invention is described in conjunction with the appended figures.

Figure 1:
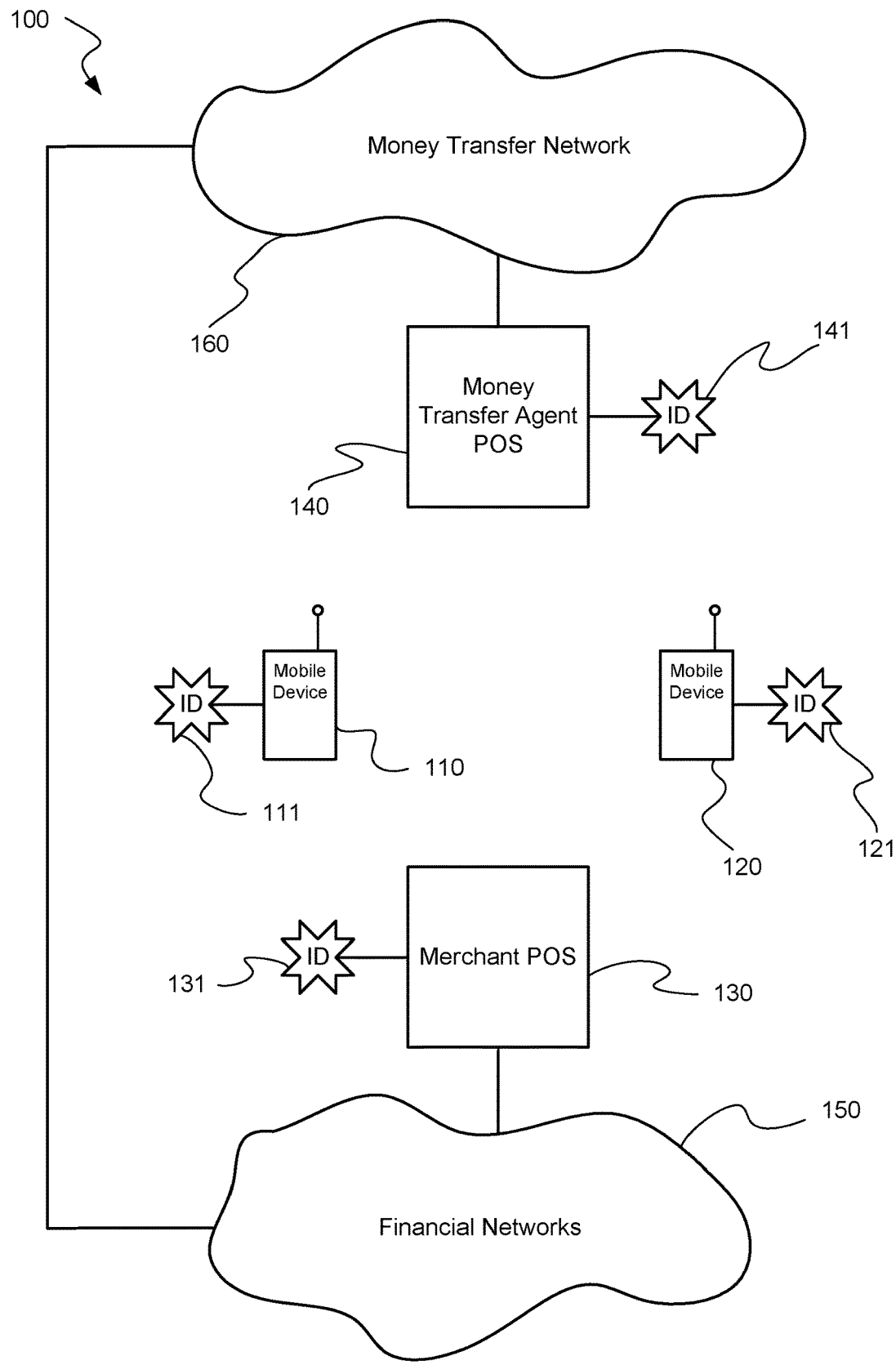
FIG. 1 is a diagram of one system of the invention for performing a money transfer between a sender and a recipient using an augmented reality enabled mobile device.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, a system for performing a money transfer between a sender an a recipient through the use of an augmented reality enabled is provided. The system may include a first mobile device. The first mobile device may, merely by way of example, be a mobile phone, a personal data assistant, a notebook or laptop computer, a tablet computer, a digital wristwatch, a electronic book, and/or any other mobile device, possibly carried by a user during regular day-to-day activities.

The first mobile device may be associated with a first entity. The first entity may possibly be the above described day-to-day user, for example, a private person. In some embodiments, the first entity may be a business entity and/or a specific cost center, possibly an individual user, associated with the entity. In these or other embodiments, a database may store a correlation table of mobile devices and the entity associated with each mobile device. Thus, in any system of the invention may be able to communicate with this database to identify an entity associated with a particular mobile device and vice versa.

The first mobile device may be configured to detect a first indicator via an augmented reality subsystem. The first indicator may be associated with a second entity and include one or more characteristics allowing it to be detected. The means of detection can vary from embodiment to embodiment, possibly depending on the type of characteristic or characteristics provided by the indicator, and mobile devices of some embodiments may have multiple means for detection.

Merely by way of example, the identifier may have a physical characteristic which may be identified (for example, size, shape, and dimensions) by the detector of the mobile device. In another example, the identifier may have a visual characteristic which may be identified (for example, size, shape, color, and brightness) by the detector of the mobile device. Cameras and other such devices may detect such identifiers.

In some embodiments, the identifier my have a location-based characteristic, wherein the location itself is the identifier, and by cross reference to a database of identifiers correlated with locations, a visual or other indicator of the identifier may queue a person or device to check the database for the existence of the identifier in the vicinity. Thus, in one example, a person may identify a location as having an identifier, and through the mobile device checking the database, the presence of an identifier at the location can be determined to exist. Devices which can detect and correlate the position of such indicators include global positioning systems, gyroscopes, accelerometers, and other location identifying devices.

In yet another embodiment, the identifier may have a characteristic radio signal, such as an RFID for example. The mobile device may be able to detect the radio signal and thus detect the presence of the identifier via an antenna or other device.

The augmented reality subsystem may be configured to associate meta-information with the first indicator based on the characteristic. Via a database lookup, or via information provided by further characteristics of the identifier, additional information may be ascertained regarding the identifier and/or the entity associated with it. Merely by way of example, the meta-information may include a business name, a personal name, a phone number, a communication address (for example, an Internet Protocol address or other network address), an account number, and/or a currency amount.

In some embodiments, the first indicator may be associated with a second mobile device. In these or other embodiments, the first indicator may be associated with a person associated with the second mobile device, possibly the user and/or owner of the second mobile device.

In some embodiments, any indicator may be static or dynamic. Merely by way of example, a static indicator may be a sticker or placard, possibly bearing a symbol (for example, a bar code) which can be detected by the augmented reality subsystem. Examples of a dynamic indicator may include a changeable display such as an electronic LED or LCD screen, or other dynamic screens known in the art. These dynamic indicators may also display symbols which can be read similarly to a static indicator. Essentially then, dynamic indicators may be capable of intelligently changing their characteristics, and therefore what meta-information is associated with the indicator, over time, and possibly at the direction of a system associated with the second entity.

The first mobile device may further be configured to receive an input including an amount to be transferred between the first entity and the second entity. This input may be received from an entity associated with the first mobile device (possibly the user), or the input may be received via detection of the first indicator and/or it's associated meta-information. This input may include an amount to be transferred from the first entity to the second entity.

Thus, in embodiments where the first indicator includes characteristics which allow an amount to be determined by the first mobile device, the second entity may communicate the amount to be transferred to the first entity via the indicator. This may be especially prevalent in embodiments where the first indicator is a dynamic indicator. Merely by way of example, an indicator could correlate to meta-information indicating a particular payee (and/or any of the other meta-information discussed above) and the amount to be paid, where the amount to be paid changes based on whatever business arrangement (for example, sale of goods and services) is being conducted between the two entities. In this example, the indicator would dynamically change based on the characteristics of the present business arrangement.

The first mobile device may moreover be configured to transmit a first set of instructions to a money transfer network. This first set of instructions may be based at least in part on the first indicator and the input as discussed above. As such, the first set of instructions may include instructions to perform a money transfer between the first entity and the second entity, and include a name, address, phone number, and/or account number of the payee, as well as similar information on the sender's side of the transaction (for example, the sender's name, address, phone number, and/or originating account number). In some embodiments, additional instructions regarding how to process the money transfer may included in the first set of instructions.

In some embodiments, details and/or confirmation of acceptance, processing, and/or completion of such a transaction may be communicated from the money transfer network to a system associated with the second entity. In some embodiments, a dynamic indicator may be changed to a null indictor once confirmation of a transaction being completed is received by the system associated with the second entity. Thus an indicator indicating essentially a request for a payment to the second entity may remain displayed by the dynamic indicator until receipt of confirmation of completion is received by the second entity's system, which is in communication with the dynamic indicator (or the system controlling the dynamic indicator).

In some embodiments, the second entity may be a merchant or other service provider. In these or other embodiments, the first mobile device may be further configured to receive a survey from the merchant after the money transfer is initiated and/or completed. The mobile device may accept answers to the survey from the user, and may then transfer such responses to the money transfer system and/or the merchant or service provider, possibly via the money transfer system.

In some embodiments, the first mobile device may be used an agent location of a money transfer network to at least assist and/or initiate money transfers to another entity. Merely by way of example, the first mobile device may be further configured to transmit a second set of instructions to a point-of-sale system associated with a money transfer network. This second set of instructions may be instructions necessary to conduct a money transfer from the user of the first mobile device, or other person, to yet another entity. This may include, for example, names, addresses, phone numbers, account numbers, identifying information, etc. regarding both the sender and receiver of the money transfer.

In some embodiments, when at an agent location, the first mobile device may be further configured to receive from a point-of-sale system associated with the money transfer network, an anticipated wait time until the first person will be assisted by a second person, wherein the second person is associated with the money transfer network, perhaps as an agent. The mobile device may be further configured to display the anticipated wait time until the first person will be assisted by the second person.

In some embodiments, service at the agent location can be initiated either by the mobile device or by a point-of-sale system at the agent location. For example, in mobile device initiated embodiments, the user of the mobile device may use the augmented reality enabled detector to detect an identifier at the agent location. In a point-of-sale device initiated embodiment, an augmented reality enable detector in communication with the money transfer system (possibly via the point-of-sale device) may initiate the money transfer process by detecting an identifier associated with the mobile device.

In another embodiment, the first mobile device may be associated with a first financial account (possibly because the user of the first mobile device is associated with the first financial account), and the second entity may be associated with a second financial account. In these embodiments, the instructions to perform a first money transfer between the first entity and the second entity may include instructions to perform a second money transfer from the first financial account to the second financial account.

As with all other features discussed herein, in various embodiments the mobile device may be configured to display, either statically or dynamically a second augmented reality indicator, and that indicator may be configured to identify the first entity, the first mobile device, and/or a financial account associated with the first mobile device or the first entity (possibly the phone service account associated with the first mobile device).

In some of these embodiments, this second augmented reality indicator may be indicative of a desire of the user of the mobile device to initiate a money transfer. Therefore, the second augmented reality indicator may include characteristics necessary, either directly, or indirectly thorough reference to a database, to determine any and/or all information necessary to conduct the money transfer as described above. This money transfer may be a purchase from a system or entity associate with a device which detects this second augmented reality indicator.

In another embodiment of the invention, a system for performing a money transfer between a sender and a recipient through the use of an augmented realty enabled device is provided. The system may include a first mobile device. The first mobile device may be associated with a first entity. The first mobile device may include a first means, a second means, a third means, and a fourth means. These embodiments may also have any of the other features discussed herein, and/or any features necessary to implement the methods discussed herein.

The first means may be for detecting a characteristic of a first augmented reality indicator associated with a second entity. The first means may include, merely by way of example, cameras, global positioning systems, gyroscopes, accelerometers, antennas and/or other equivalent devices discussed herein and further becoming known in the future.

The second means may be for associating meta-information with the first augmented reality indicator based on the characteristic. The second means may include, merely by way of example, processors, databases, electrical communication systems, and/or other equivalent devices discussed herein and further becoming known in the future.

The third means may be for receiving an input comprising an amount to be transferred from the first entity to the second entity. This may refer to a user input device on a mobile device, or where the detected identifier can relate the amount to be transferred, the identifier detection subsystem. The third means may include, merely by way of example, input devices on mobile phones, personal data assistants, notebook computers, laptop computers, tablet computers, digital wristwatches, electronic books, other sensing devices discussed above, and/or other equivalent devices discussed herein and further becoming known in the future.

The fourth means may be for transmitting a first set of instructions to a money transfer network. The first set of instructions may be based at least in part on the first indicator and the input. The first set of instructions may include instructions to perform a first money transfer between the first entity and the second entity. The fourth means may include, merely by way of example, communications systems on mobile phones, personal data assistants, notebook computers, laptop computers, tablet computers, digital wristwatches, electronic books, other communication devices therein or thereon, and/or other equivalent devices discussed herein and further becoming known in the future.

In another embodiment of the invention, a method for performing a money transfer between a first entity and a second entity through the use of an augmented reality enabled device is provided. The method may include detecting a first indicator via an augmented reality subsystem. The first indicator may be associated with the second entity. The first indicator may include a characteristic. The method may also include associating, with the augmented reality subsystem, meta-information with the first indicator based on the characteristic. The method may further include receiving an input including an amount to be transferred from the first entity to the second entity. The method may moreover include transmitting a first set of instructions to a money transfer network. The first set of instructions may be based at least in part on the first indicator and the input. The first set of instructions may include instructions to perform a money transfer between the first entity and the second entity. These embodiments may also have any of the other features discussed herein, and/or any features necessary to implement the methods discussed herein.

Turning now to FIG. 1, a diagram of one system 100 of the invention for performing a money transfer between a sender and a recipient using an augmented reality enabled mobile device is shown.

A first mobile device 110 has a first augmented reality identifier 111. A second mobile device 120 has a second augmented reality identifier 121. These identifiers, as well as all other identifiers shown in system 100, may be either static or dynamic.

System 100 may also include merchant point-of-sale (POS) system 130 having a third augmented reality identifier 131. System 100 may further include a money transfer agent point-of-sale system 140 having a fourth augmented reality identifier 141.

System 100 may also include various financial networks 150 (for example, credit, ATM, ACH, etc.) in communication with money transfer networks 160 (for example, Western Union®, etc.). Each of these networks may be further in communication with merchant POS 130 and money transfer agent POS 140.

One or more databases, not shown, may also be in communication with system 100, and components thereof. These databases may include information correlating entity identifying and financial information with various identifiers. Any particular subsystem of system 100 may be in communication with this database to conduct the methods of the invention.

Figure 2:
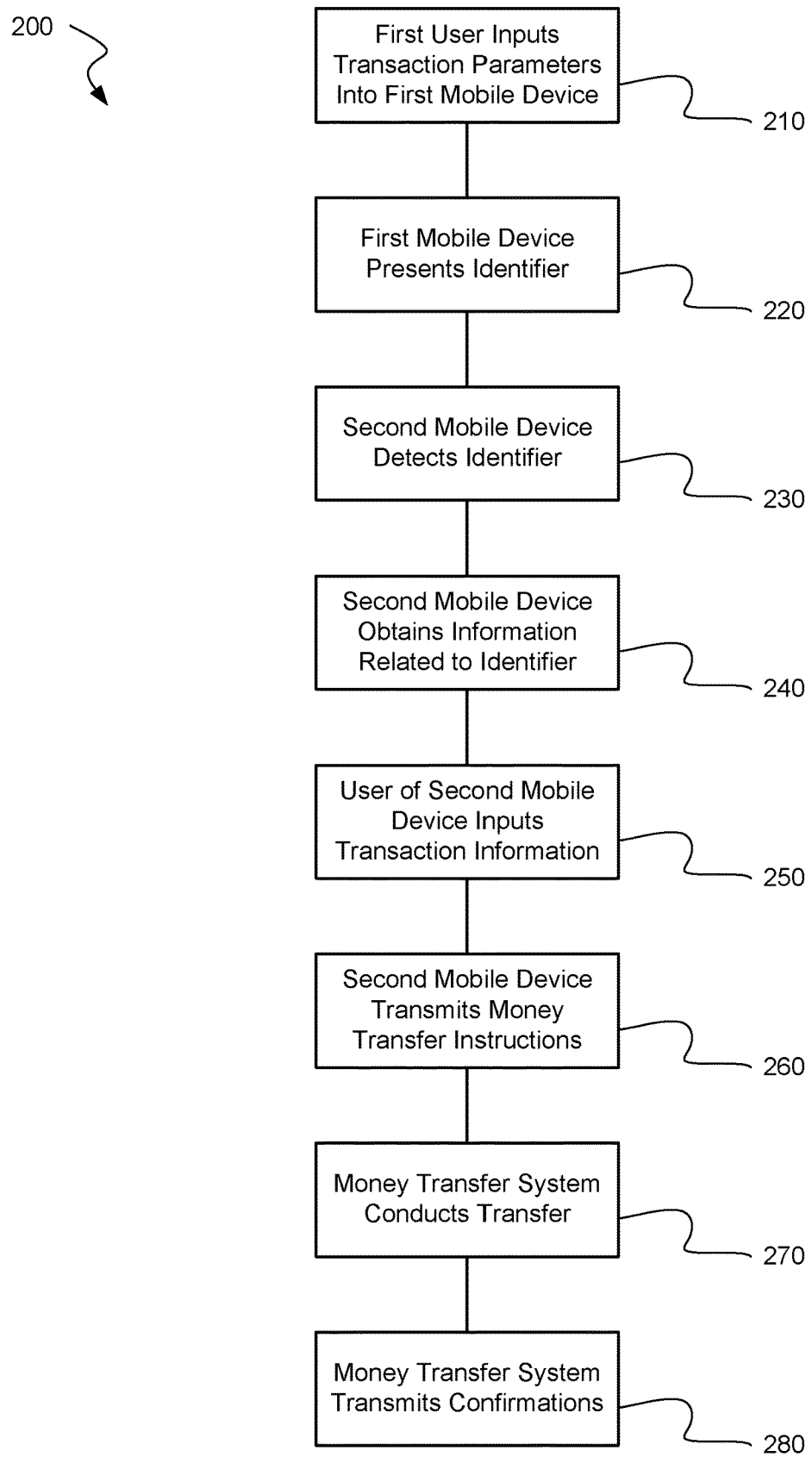
FIG. 2 is a block diagram of a method of the invention for performing a money transfer between a sender and a recipient, with either one or both sender and recipient being equipped with augmented reality enabled mobile devices.

FIG. 2 shows a block diagram of a method 200 of the invention for performing a money transfer between a sender and a recipient, with either one or both sender and recipient being equipped with augmented reality enabled mobile devices.

At block 210, a first user inputs transaction parameters into a first mobile device 110. The mobile device 110 then determines what identifier to present based on the inputted transaction parameters, and presents the identifier 111 at block 220.

At block 230, a second user employs a second mobile device 120 to detect identifier 111. At block 240, the second mobile device 120 obtains information related to the identifier 111. This information may be obtained either by cross referencing characteristics of the identifier 111 with known meanings for those characteristics (within mobile device 120), or the information may be obtained by lookup on a centralized database.

At block 250, the user of the second mobile device 120 may input additional transaction information. Combining any input information from the second user, along with information related to the identifier 111 (either determined or original characteristics of identifier 111), at block 260, money transfer instructions are transmitted to a money transfer network 160.

At block 270, the money transfer network conducts the financial transfer. At block 280, the money transfer network 160 may transmit a confirmation to either one or both of the first and second users, and/or first mobile device 110 and/or second mobile device 120.

Figure 3:
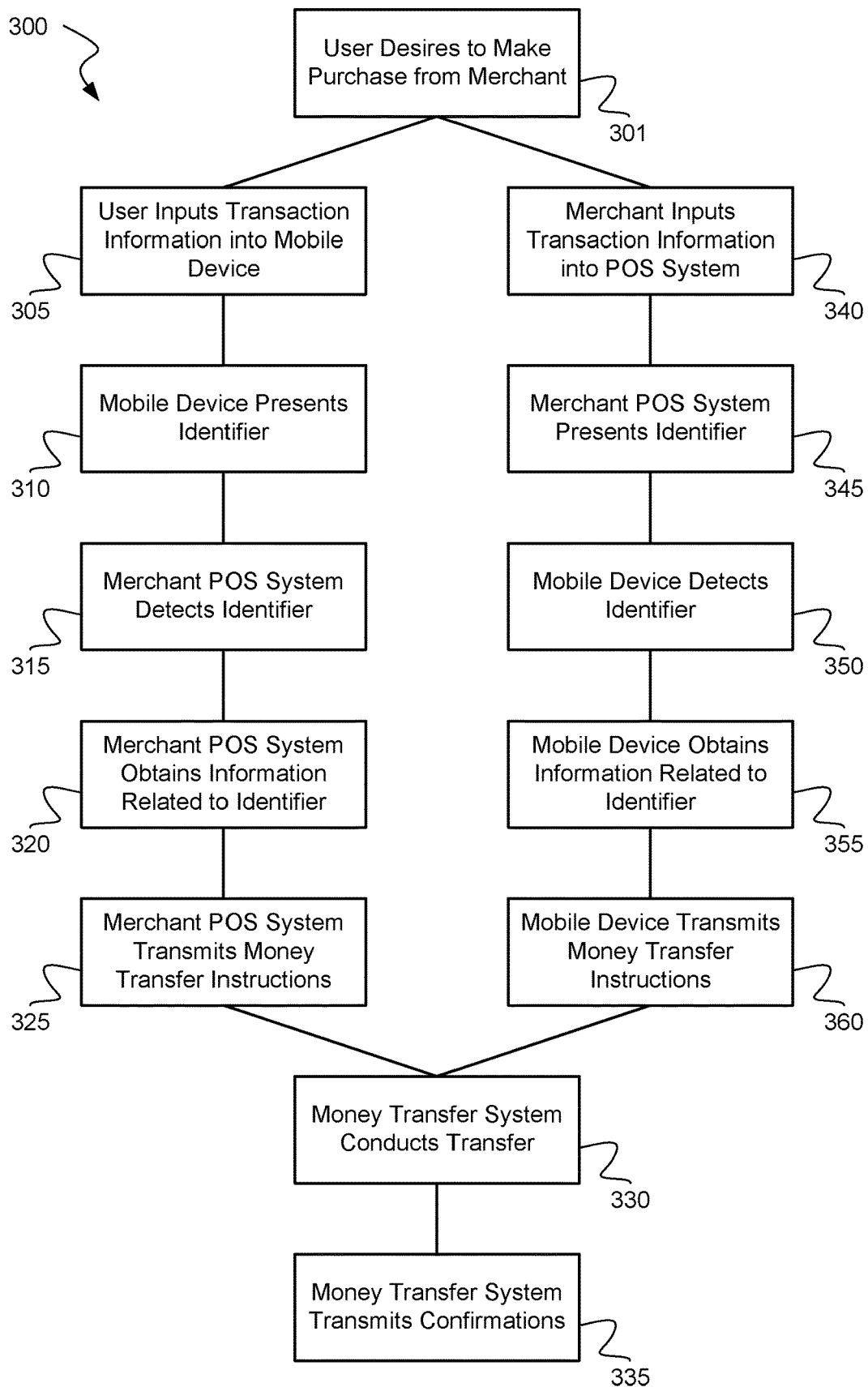
FIG. 3 is a block diagram of a method of the invention for performing a money transfer between a sender and a merchant, with either one or both sender and merchant being equipped with augmented reality enabled devices.

FIG. 3 shows a block diagram of a method 300 of the invention for performing a money transfer between a sender and a merchant, with either one or both sender and merchant being equipped with augmented reality enabled devices. At block 301, a user desires to make a purchase from a merchant.

In one possible embodiment of the invention, at block 305, a user inputs transaction parameters into a mobile device 110. The mobile device 110 then determines what identifier to present based on the inputted transaction parameters, and presents the identifier 111 at block 310.

At block 315, a merchant employs a merchant POS 130 to detect identifier 111. At block 320, the merchant POS 130 obtains information related to the identifier 111. This information may be obtained either by cross referencing characteristics of the identifier 111 with known meanings for those characteristics (within merchant POS 130), or the information may be obtained by lookup on a centralized database.

At block 325, along with any input-by-merchant additional transaction information, money transfer instructions are transmitted to a money transfer network 160, possibly via financial network 150.

In another embodiment of the invention, at block 310, a merchant inputs transaction parameters into a merchant POS 130. The merchant POS 130 then determines what identifier to present based on the inputted transaction parameters, and presents the identifier 131 at block 345.

At block 350, the user employs the mobile device 110 to detect identifier 131. At block 355, the mobile device 110 obtains information related to the identifier 131. This information may be obtained either by cross referencing characteristics of the identifier 131 with known meanings for those characteristics (within mobile device 110), or the information may be obtained by lookup on a centralized database.

At block 360, along with any input-by-user additional transaction information, money transfer instructions are transmitted to a money transfer network 160.

At block 330, the money transfer network 160 and/or financial network 150 conducts the financial transfer. At block 335, the money transfer network 160 may transmit a confirmation to either one or both of the user and merchant, and/or mobile device 110 and/or merchant POS 130.

Figure 4:
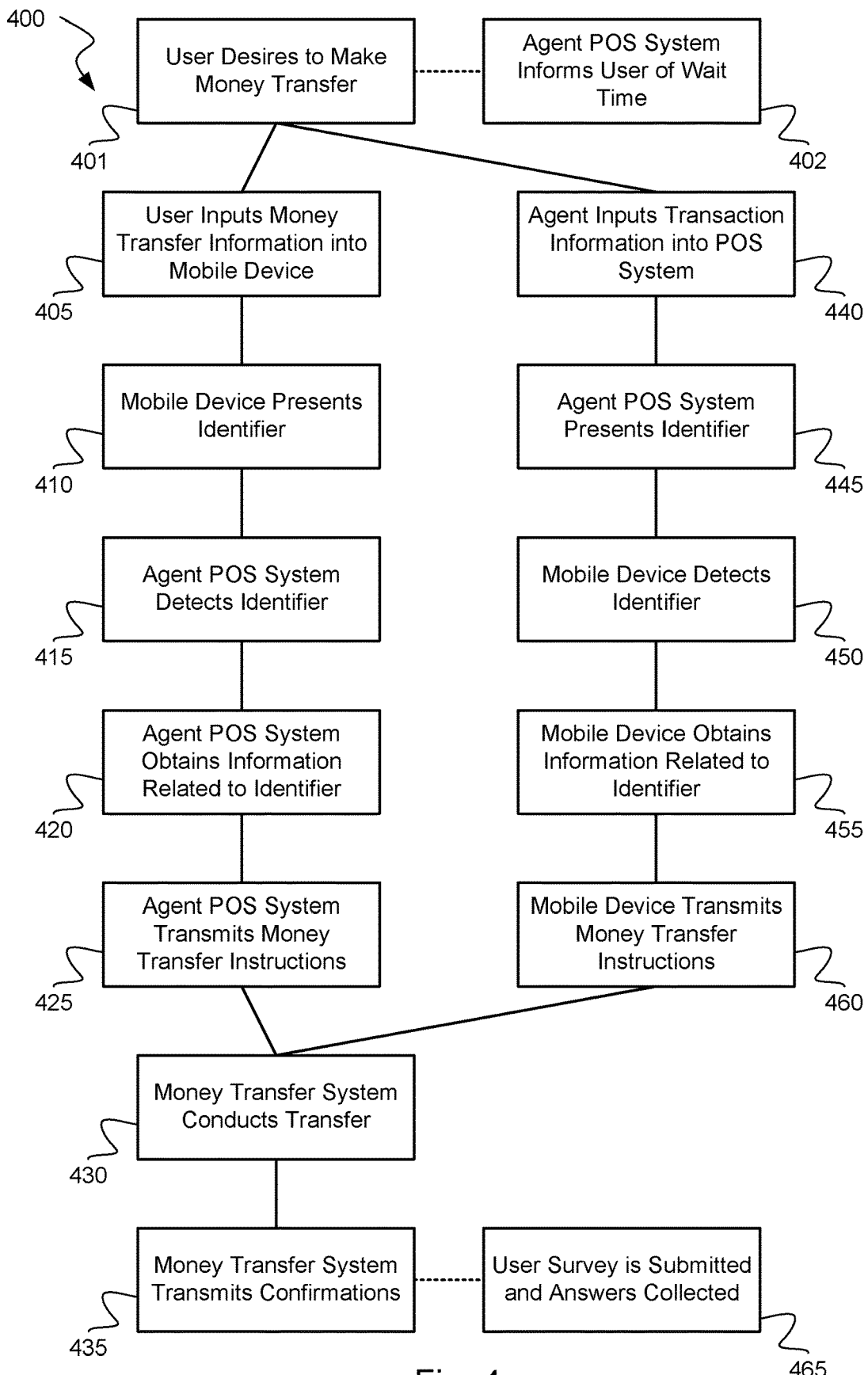
FIG. 4 is a block diagram of a method of the invention for performing a money transfer using a money transfer service, where either one or both sender and money transfer service being equipped with augmented reality enabled devices.

FIG. 4 shows a block diagram of a method of the invention for performing a money transfer using a money transfer service, where either one or both sender and money transfer service being equipped with augmented reality enabled devices. At block 401, a user desires to make a money transfer at money transfer service agent location. At block 402, the agent POS 140 may inform the user of a wait time before the user is assisted by an agent. This may occur via an identifier detector of the agent POS 140 detecting an identifier of the user's mobile device 111 and cross-check of current agent availability/workload/scheduling.

In one possible embodiment of the invention, at block 405, a user inputs transaction parameters into a mobile device 110. The mobile device 110 then determines what identifier to present based on the inputted transaction parameters, and presents the identifier 111 at block 410.

At block 415, a money transfer agent employs an agent POS 140 to detect identifier 111. At block 420, the agent POS 140 obtains information related to the identifier 111. This information may be obtained either by cross referencing characteristics of the identifier 111 with known meanings for those characteristics (within agent POS 140), or the information may be obtained by lookup on a centralized database.

At block 425, along with any input-by-agent additional transaction information, money transfer instructions are transmitted to money transfer network 160.

In another embodiment of the invention, at block 410, an agent inputs transaction parameters into an agent POS 130. The agent POS 130 then determines what identifier to present based on the inputted transaction parameters, and presents the identifier 141 at block 445.

At block 450, the user employs the mobile device 110 to detect identifier 141. At block 455, the mobile device 110 obtains information related to the identifier 141. This information may be obtained either by cross referencing characteristics of the identifier 141 with known meanings for those characteristics (within mobile device 110), or the information may be obtained by lookup on a centralized database.

At block 460, along with any input-by-user additional transaction information, money transfer instructions are transmitted to money transfer network 160.

At block 430, the money transfer network 160 and/or financial network 150 conducts the financial transfer. At block 435, the money transfer network 160 may transmit a confirmation to either one or both of the user and agent, and/or mobile device 110 and/or agent POS 130. At block 465, a user survey may be submitted and answers collected as described herein.

Figure 5:
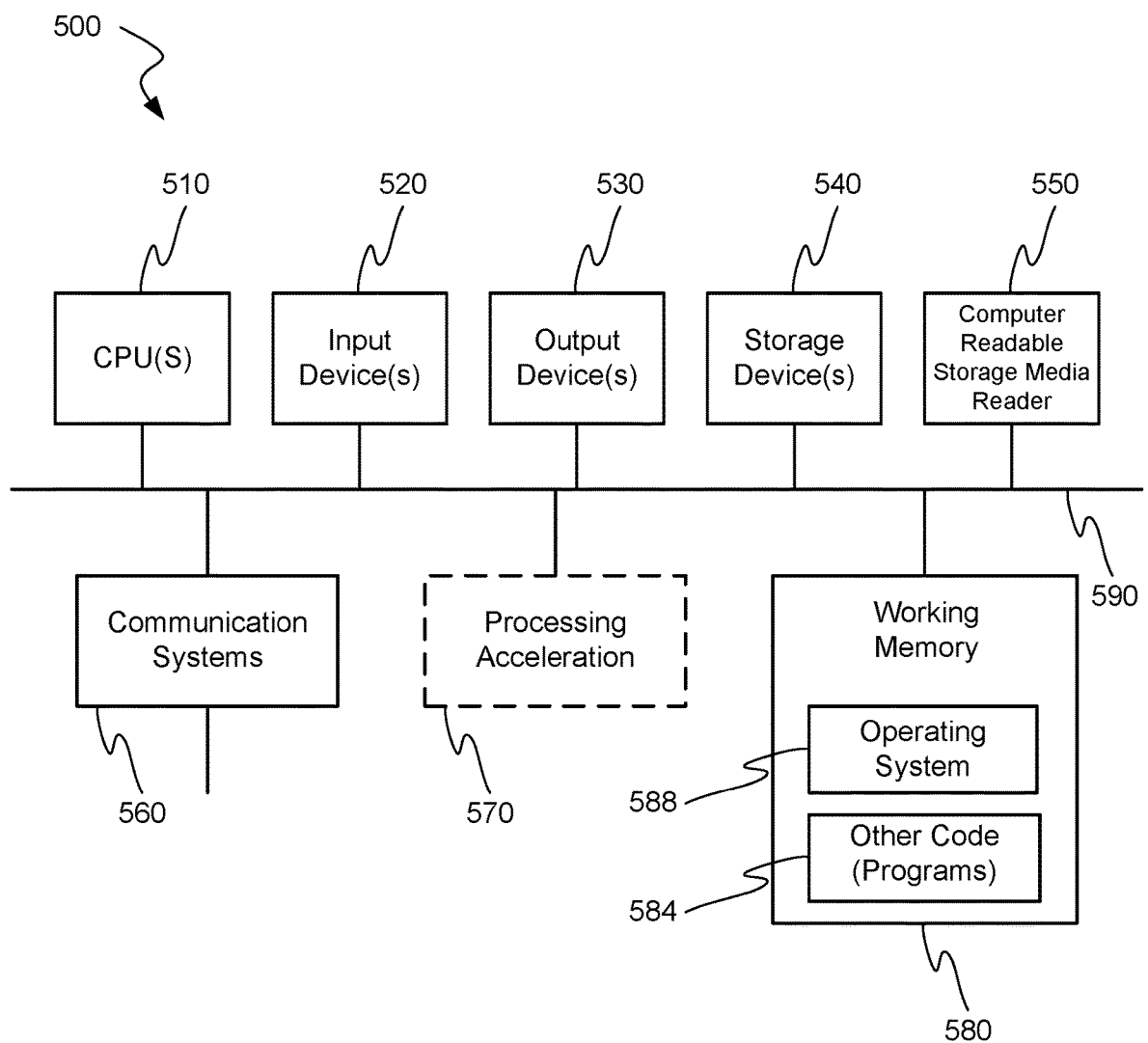
FIG. 5 is a block diagram of an exemplary computer system capable of being used in at least some portion of the apparatuses or systems of the present invention, or implementing at least some portion of the methods of the present invention.

FIG. 5 is a block diagram illustrating an exemplary computer system 500 in which embodiments of the present invention may be implemented. This example illustrates a computer system 500 such as may be used, in whole, in part, or with various modifications, to provide the functions of the mobile devices 110, 120, the merchant POS 130, the agent POS 140, the financial networks 150, the money transfer network 160, and/or other components of the invention such as those discussed above. For example, various functions of the mobile device 110, 120 may be controlled by the computer system 500, including, merely by way of example, displaying identifiers, determining what identifiers to display, detecting identifiers, determining information related to identifiers either locally or by access to a remote database, transmission of instructions, receipt of confirmations, etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of the mobile devices 110, 120, the merchant POS 130, the agent POS 140, the financial networks 150, the money transfer network 160, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A system for performing transactions via multiple computing devices, the system comprising:

a first computing device associated with a first entity, wherein the first computing device comprises:
  a processing unit comprising one or more processors;
  one or more hardware-based detectors;
  one or more user input components; and
  memory readable by the processing unit and storing therein a set of instructions which, when executed by the processing unit, causes the first computing device to:
    use an augmented reality application operating on the first computing device and activate at least one of the one or more hardware-based detectors to detect one or more indicators that correspond to one or more of a visual dynamic indicator comprising one or more symbols displayed via a display screen of a second computing device, and one or both of a location-based indicator associated with a first geographic location and the second computing device and a radio frequency signal indicator associated with the second computing device, wherein the second computing device is separate from the first computing device;
    analyze the one or more indicators with the augmented reality application to identify the visual dynamic indicator based at least in part on at least one of a frequency and/or brightness of the detected one or more indicators, and associate meta-information with the one or more indicators, where each of the one or more indicators is capable of changing its characteristics, and the meta-information associated with the indicator over time, the meta-information comprising an Internet protocol address;
    determine a transaction party associated with the second computing device based at least in part on the analyzing the one or more indicators with the augmented reality application;
    receive input, via the one or more user input components, specifying one or more transaction parameters comprising at least a numerical transaction amount to be transferred between a first entity associated with the first computing device and a second entity associated with the second computing device corresponding to the transaction party; and
    consequent to the receiving the input specifying the one or more transaction parameters, transmit instructions to a computer server of a transaction network, the instructions corresponding to instructions to initiate a transaction between the first computing device and the second computing device and associated with the first entity and the second entity;

the computer server of the transaction network, wherein the computer server comprises:
  a processing unit comprising one or more processors; and
  memory readable by the processing unit and storing therein a set of instructions which, when executed by the processing unit, causes the computer server to:
    receive the instructions from the first computing device to initiate the transaction between the first computing device and the second computing device;
    determine, based on the instructions received from the first computing device, the numerical transaction amount;
    transmit a notification to the second computing device including transaction details corresponding to the one or more transaction parameters and the first entity for the transaction to be initiated between the first computing device and the second computing device; and the second computing device, wherein the second computing device comprises:
  a processing unit comprising one or more processors; and
  memory readable by the processing unit and storing therein a set of instructions which, when executed by the processing unit, causes the second computing device to:
    output the visual dynamic indicator associated with the second computing device;
    receive the notification from the computer server of the transaction network, including the transaction details corresponding to the one or more transaction parameters and the first entity for the transaction to be initiated between the first computing device and the second computing device; and
    in response to determining that one or more operations corresponding to the transaction has been completed, changing the visual dynamic indicator comprising the one or more symbols displayed via the display screen of the second computing device to output a null indicator on the display screen instead of the visual dynamic indicator.

2. The system for performing transactions of claim 1, wherein the one or more hardware-based detectors of the first computing device comprise a camera, and wherein the detecting the one or more indicators associated with the second computing device comprises:
  activating the camera of the first computing device to capture a visual image of at least one indicator of the one or more indicators;
  analyzing the captured visual image of the indicator to determine a size, a shape, and a color of the at least one indicator; and
  where the determining the transaction party associated with the second computing device is based on the size, the shape, and the color of the at least one indicator.

3. The system for performing transactions of claim 1, wherein the one or more indicators comprise the location-based indicator associated with the first geographic location, wherein the one or more hardware-based detectors of the first computing device comprise a global positioning system (GPS) receiver, and wherein the detecting the one or more indicators associated with the second computing device comprises:
  activating the GPS receiver of the first computing device to determine a current location of the first computing device; and
  comparing the current location of the first computing device to a plurality of locations associated with a plurality of location-based indicators, and wherein the first computing device determines the transaction party associated with the second computing device, based on the comparison of the current location of the first computing device to the first geographic location associated with the location-based indicator.

4. The system for performing transactions of claim 1, wherein the one or more indicators comprise a radio frequency (RF) signal indicator transmitted by the second computing device, wherein the one or more hardware-based detectors of the first computing device comprise an RF receiver, and wherein the detecting the one or more indicators associated with the second computing device comprises:
   activating the RF receiver of the first computing device to detect the RF signal indicator transmitted by the second computing device; and
   comparing the detected RF signal indicator to a plurality of RF indicator signals associated with a plurality of entities,
   wherein the first computing device determines the transaction party associated with the second computing device, based on the comparison of the RF signal transmitted by the second computing device to the plurality of RF indicator signals.

5. A method of performing transactions via multiple computing devices, the method comprising:
   using an augmented reality application operating on the first computing device and activate at least one of one or more hardware-based detectors to detect by first computing device, one or more indicators that correspond to one or more of a visual dynamic indicator comprising one or more symbols displayed via a display screen of a second computing device, and one or both of a location-based indicator associated with a first geographic location and the second computing device and a radio frequency signal indicator associated with the second computing device separate from the first computing device, wherein the first computing device is associated with a first entity;
   analyze the one or more indicators with the augmented reality application to identify the visual dynamic indicator based at least in part on at least one of a frequency and/or brightness of the detected one or more indicators, and associate meta-information with the one or more indicators, where each of the one or more indicators is capable of changing its characteristics, and the meta-information associated with the indicator over time, the meta-information comprising an Internet protocol address;
   determine a transaction party associated with the second computing device based at least in part on the analyzing the one or more indicators with the augmented reality application;
   receiving, by the first computing device, user input via one or more user input components of the first computing device, the user input specifying one or more transaction parameters comprising a numerical transaction amount to be transferred between a first entity associated with the first computing device and a second entity associated with the second computing device corresponding to the transaction party; and
   consequent to the receiving the user input specifying the one or more transaction parameters, transmitting, by the first computing device, instructions to a computer server of a transaction network, the instructions corresponding to instructions to initiate a transaction between the first entity and the second entity for the numerical transaction amount.

6. The method of claim 5, wherein detecting the one or more indicators connected to the second computing device comprises activating a camera of the first computing device to capture a visual image of at least one indicator of the one or more indicators, and
   wherein the determining the transaction party based on the at least one indicator comprises analyzing the captured visual image of the indicator to determine a size, a shape, and a color of the at least one indicator.

7. The method of claim 5, wherein the detecting the one or more indicators connected to the second computing device comprises activating a radio-frequency (RF) receiver of the first computing device to detect a particular RF signal indicator transmitted by the second computing device, and
   wherein the determining the transaction party based on the one or more indicators comprises comparing the particular RF signal indicator transmitted by the second computing device to a plurality of RF indicator signals associated with a plurality of entities.

8. The method of claim 5, wherein the detecting the one or more indicators connected to the second computing device comprises activating a global positioning system (GPS) receiver of the first computing device to determine a current location of the first computing device, and wherein the determining the transaction party based on the one or more indicators comprises comparing the current location of the first computing device to a plurality of locations associated with a plurality of location-based indicators.

9. The method of claim 5, wherein the visual dynamic indicator changes over time.

10. The method of claim 5, further comprising:
    determining a second indicator based on the one or more transaction parameters; and
    outputting the second indicator via a display screen of the first computing device.

11. The method of claim 10, wherein the second indicator output via the display screen of the first computing device comprises a dynamic indicator, and wherein the method further comprises:
    determining that the numerical transaction amount has been received from the second entity; and
    changing the second indicator output via the display screen of the first computing device to output a null indicator on the display screen instead of the second indicator, in response to determining that the numerical transaction amount has been received from the second entity.

12. A non-transitory, computer-readable medium for performing transactions via multiple computing devices, having instructions stored thereon which, when executed by a first computing device, cause the first computing device to:
    use an augmented reality application operating on the first computing device and activate at least one of one or more hardware-based detectors to detect one or more indicators that correspond to one or more of a visual dynamic indicator comprising one or more symbols displayed via a display screen of a second computing device, and one or both of a location-based indicator associated with a first geographic location and the second computing device and a radio frequency signal indicator associated with a second computing device separate from the first computing device;
    analyze the one or more indicators with the augmented reality application to identify the visual dynamic indicator based at least in part on at least one of a frequency and/or brightness of the one or more indicators, and associate meta-information with the detected one or more indicators, where each of the one or more indicators is capable of changing its characteristics, and the meta-information associated with the indicator over time, the meta-information comprising an Internet protocol address;

determine a transaction party associated with the second computing device based at least in part on the analyzing the one or more indicators with the augmented reality application;

receive user input via one or more user input components of the first computing device, the user input specifying one or more transaction parameters comprising a numerical transaction amount to be transferred between a first entity associated with the first computing device and a second entity associated with the second computing device corresponding to the transaction party; and consequent to the receiving the user input specifying the one or more transaction parameters, transmit instructions to a computer server of a transaction network, the instructions corresponding to instructions to initiate a transaction between the first computing device and the second computing device for the numerical transaction amount.

13. The non-transitory, computer-readable medium for performing transactions via multiple computing devices of claim 12, wherein the detecting the one or more indicators connected to the second computing device comprises activating a camera of the first computing device to capture a visual image of at least one indicator of the one or more indicators, and wherein the determining the transaction party associated with the second computing device is based on analyzing the captured visual image of the indicator to determine a size, a shape, and a color of the indicator.

14. The non-transitory, computer-readable medium for performing transactions via multiple computing devices of claim 12, wherein the detecting the one or more indicators connected to the second computing device comprises activating a radio-frequency (RF) receiver of the first computing device to detect a particular RF signal indicator transmitted by the second computing device, and wherein the first computing device determines the transaction party associated with the second computing device based on the particular RF signal indicator, by comparing the particular RF signal indicator transmitted by the second computing device to a plurality of RF indicator signals associated with a plurality of entities.

15. The non-transitory, computer-readable medium for performing transactions via multiple computing devices of claim 12, wherein the detecting the one or more indicators connected to the second computing device comprises activating a global positioning system (GPS) receiver of the first computing device to determine a current location of the first computing device, and wherein the first computing device determines the transaction party associated with the second computing device based on comparing the current location of the first computing device to a plurality of locations associated with a plurality of location-based indicators.

16. The non-transitory, computer-readable medium for performing transactions via multiple computing devices of claim 12, wherein the visual dynamic indicator changes over time.

17. The non-transitory, computer-readable medium for performing transactions via multiple computing devices of claim 12, the instructions further cause the first computing device to:

determine a second indicator based on the one or more transaction parameters; and output the second indicator via a display screen of the first computing device.

18. The non-transitory, computer-readable medium for performing transactions via multiple computing devices of claim 17, wherein the second indicator output via the display screen of the first computing device comprises a dynamic indicator, and the instructions further cause the first computing device to:

determine that the numerical transaction amount has been received from a second entity associated with the second computing device; and change the second indicator output via the display screen of the first computing device to output a null indicator on the display screen instead of the second indicator, in response to determining that the numerical transaction amount has been received from the second entity.

* * * * *